United States Patent [19]

Hawkes

[11] Patent Number: 5,056,043
[45] Date of Patent: Oct. 8, 1991

[54] METHOD AND APPARATUS FOR INTERFACING A THERMAL PRINTER

[75] Inventor: Calvert T. Hawkes, Newport, R.I.

[73] Assignee: Island Software, Inc., Middletown, R.I.

[21] Appl. No.: 514,849

[22] Filed: Apr. 25, 1990

[51] Int. Cl.⁵ .............................................. G06K 15/00
[52] U.S. Cl. ............................. 364/519; 346/76 PH; 364/930; 364/900
[58] Field of Search .............................. 364/518-520, 364/235 MS, 930 MS; 346/76 PH, 1.1; 400/120; 219/216

[56] References Cited

U.S. PATENT DOCUMENTS 4,844,632  7/1989  Minowa .................... 346/76 PH
4,912,485  3/1990  Minowa .................... 346/76 PH Primary Examiner—Arthur G. Evans
Attorney, Agent, or Firm—Wolf, Greenfield & Sacks

[57] ABSTRACT

A method and apparatus are provided for interfacing a thermal printer with a selected processor. The interface determines the operating speed of the processor as an initial step by running a speed routine which determines the time required by the processor to load a data byte and overhead time for such loading. A line of bytes, which may be grouped into sections, are then loaded into a first printer buffer at the same time a line of data in a second printer buffer is being strobed to control printing. After each line is loaded and printed, the contents of the first buffer are transferred into the second buffer. Strobe duration is controlled to be equal to a selected number of byte load times fine adjusted by byte overhead times. A strobe latch may be provided with a bit position for each byte section in a line to be printed. By selectively loading one or more bits into the strobe latch, any combination of one or more sections may be strobed during a given strobe cycle. This permits the peak power requirements for the printer to be controlled.

19 Claims, 7 Drawing Sheets

METHOD AND APPARATUS FOR INTERFACING A THERMAL PRINTER

FIELD OF THE INVENTION

This invention relates to a method and apparatus for interfacing a thermal printer, and more particularly to a thermal printer interface with a variety of processors which permits the printer to be run directly from the processor regardless of differences in the processor operating speeds.

BACKGROUND OF THE INVENTION

Thermal printers are commonly employed to produce high resolution labels, bar codes and the like. Typically, a processor, such as for example a personal computer (PC), is initially utilized to lay out a particular label or other item to be printed. The material to be printed is then loaded into a special purpose controller, which is normally microprocessor based, the thermal printer being operated from the controller.

Such microprocessor based controllers have a number of limitations and other disadvantages. First, such controllers are usually relatively expensive. The high cost of these units is disadvantageous both because of the initial cost to the customer, and because the cost makes it impractical to merely swap a controller in the field if problems develop, requiring expensive service calls and other maintenance problems.

A second problem with controllers of this type is that their features are frozen at the time the operating program for the controller is burned into the controller ROM. While as many features as possible are normally fit into the limited memory space available, a simple change like providing a non-standard font would generally require creating a special version of the ROM. Since the ROM is generally not considered a user replaceable part, the cost of upgrades to either provide new features or to fix bugs is relatively high.

Finally, microprocessor based controllers are relatively large, the controller board being as large as 5 X 8 inches. In some applications, where space is limited, the size of such boards may make it impractical to use a thermal printer; and in any event, more careful, more expensive design may be required in order to accommodate the board on a standard printer.

One potential solution to the various problems discussed above is to use the same PC or other computer which was used to generate the item to be printed to also control the thermal printer. This would eliminate the requirement for a separate microprocessor-based controller, thus presumably reducing controller costs, and would provide far greater flexibility in that a software based system could be upgraded by merely providing a new disk or other storage medium containing a desired programming change. It might also be possible to make such changes on line to a number of printers in a system through the use of modems or other standard networking techniques.

However, there are a number of problems in operating a thermal printer directly from a PC or other selected processor which have heretofore prevented the operation of thermal printers in this way. The first problem is that the strobes used to control the energizing of the thermal elements of the printer print head must be precisely controlled in duration so that the image is dark enough to be easily visible without causing over exposing of the paper or other medium being printed on. Relatively small variations in strobe time can result in unacceptable print quality, or even damage to the print head. However, since processors which may be utilized to control the printer may have differing operating speeds, even though they are capable of running the same software, there has been some difficulty in the past in designing such a computer/thermal printer interface which provides good print quality regardless of the operating speed of the processor.

Another problem is that, while printing may be accomplished more rapidly if an entire line of data to be printed is strobed at the same time, this results in a very high peak current during strobing. The requirement for such high peak currents may be unacceptable in many applications. Therefore, a line of data to be printed is typically divided into a number of sections, each of which may be independently strobed. Thus, depending on the acceptable peak current for the system, it may be desirable to strobe each of the sections of the line separately, or to strobe some selected combination of two or more of the sections simultaneously. It is preferable that the strobing sequence for each line to be printed, which line may for example not have data in all byte positions, be program controllable so as to permit any one or more sections for the line to be strobed during a given strobe cycle, and thus to provide maximum flexibility. Current microprocessor-based systems do not provide this capability.

Another factor which has heretofore limited the use of a personal computer to control a thermal printer is the limited number of output lines from the parallel port of personal computers. This port does not contain enough lines to simultaneously transfer all of the data, controls and strobes required to effectively operate a thermal printer.

A need therefore exists for an improved interface for permitting a thermal printer to be operated directly from a personal computer or other general purpose processor rather than from a special purpose controller, thus providing greater flexibility in the operation of the printer while reducing costs and minimizing controller space requirements. Such an interface should permit processors having different operating speeds to be utilized without affecting strobe duration which is accurately controlled. The interface should also permit peak current to be controlled by flexibly strobing one or more sections of a line to be printed during each strobe cycle and should permit all required data and strobes to be passed through the single parallel port from the processor.

SUMMARY OF THE INVENTION

In accordance with the above, this invention provides an interface for operating a thermal printer from a selected processor and a method for performing such interfacing. The interface determines the operating speed of the processor as an initial step by running a speed routine which determines the time required by the processor to load a data byte and the overhead time of the processor in loading a byte. A line of data is then loaded into a buffer in the thermal printer. Preferably, there are two buffers in the printer, a first buffer into which data is loaded, and a second buffer into which a line of data is transferred once the first buffer has been loaded. The second buffer may be utilized in conjunction with the strobes to control the energizing of the thermal elements of the printer print head. The determined operating speed of the processor is utilized by the program when generating each strobe, thus permitting a desired strobe duration to be obtained regardless of the operating speed of the processor. The print head temperature may also be sensed and the strobe duration also controlled in response to the detected head temperature. If the sensed temperature exceeds a predetermined threshold, operation of the print head may be terminated.

The loading of data into the first buffer of the print head and the strobing of data from the second buffer of the print head are preferably performed concurrently. Each line of data may be formed of a plurality of bytes with the bytes of a line being serially loaded into the first register. Data line sections may be designated, each formed of a selected plurality of bytes, with any one or more of the sections of a data line stored in the second buffer being energized simultaneously. For a preferred embodiment, a strobe latch is provided having a bit position for each section of a data line. Before each strobe, a bit is loaded into the strobe latch in the one or more bit positions corresponding to the sections to be strobed during the next strobe. For a preferred embodiment, the strobe latch is loaded in parallel from the selected processor while the bits of a data line are serially loaded from the same processor. Normally the serial data bits are passed from the processor to the first buffer, 1 bit or 1 byte at a time, but such passing is inhibited when bits are being passed to the strobe latch.

The foregoing and other objects, features and advantages of the invention will be apparent from the following more particular description of a preferred embodiment of the invention as illustrated in the accompanying drawings.

IN THE DRAWINGS

FIG. 1 is a schematic block diagram of a thermal printer system including an interface in accordance with the teachings of this invention.

FIG. 2 a flow diagram of a main program utilized to control interfacing in accordance with the teachings of this invention.

Figure 2:
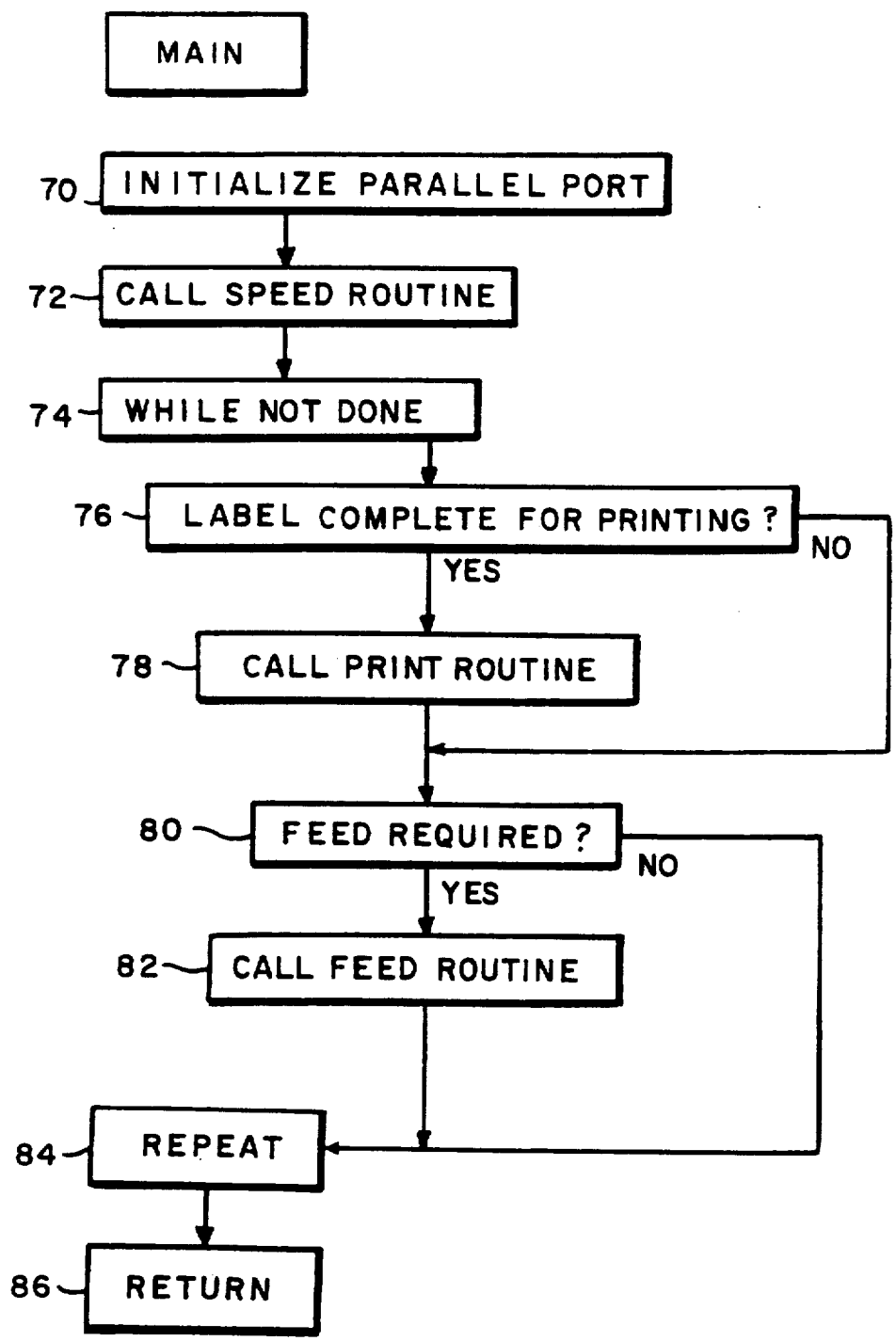
Figure 5:
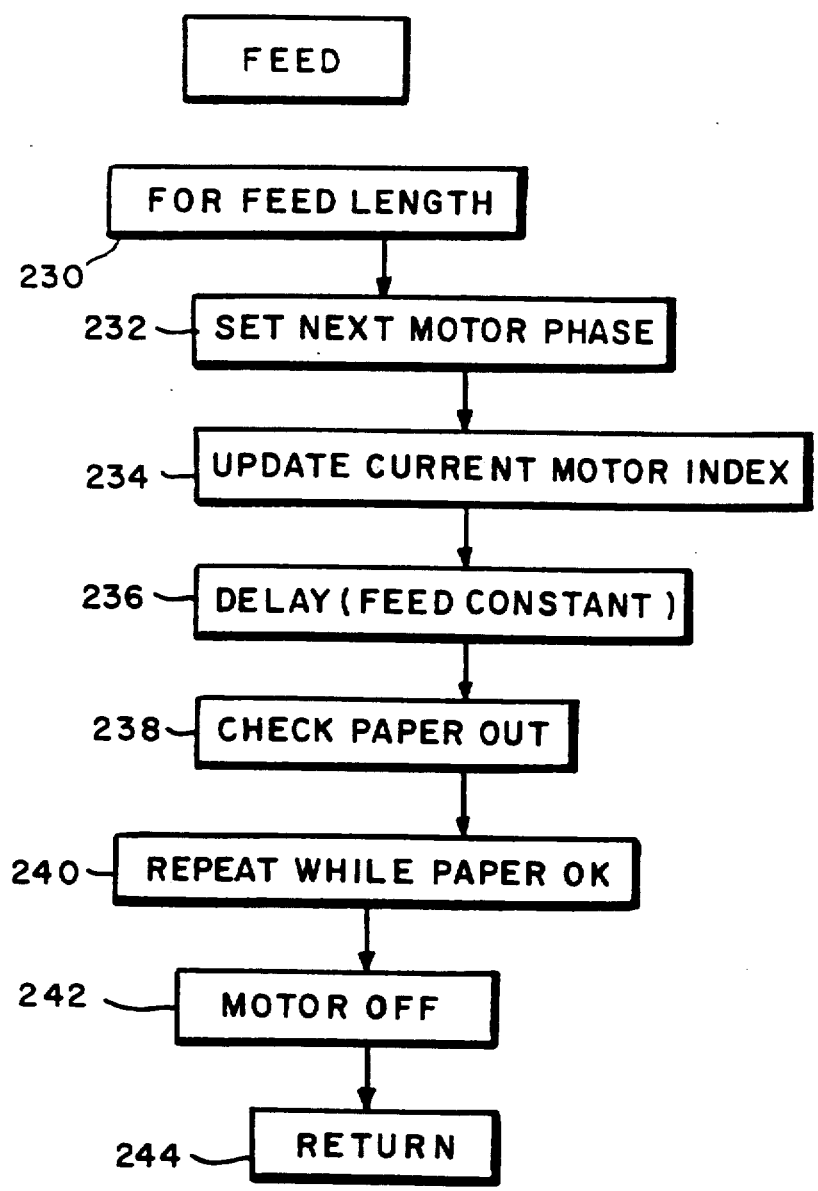

FIG. 5 a flow diagram of a "feed" routine suitable for use as the "feed" routine in the program of FIG. 2.

Figure 4:
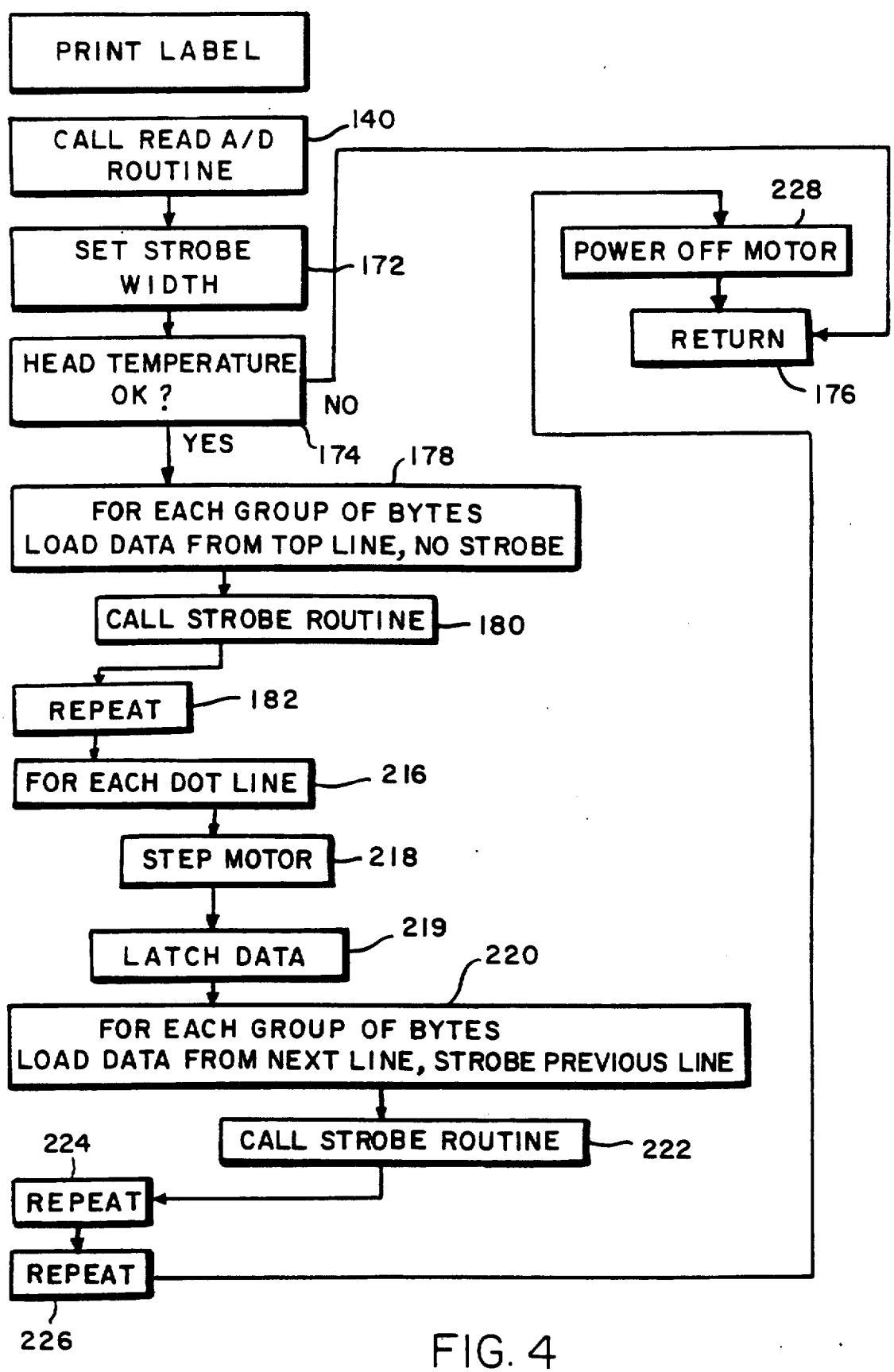
FIG. 4 is a flow diagram of a "print" routine suitable for use as the "print" routine in the program of FIG. 2.
Figure 6:
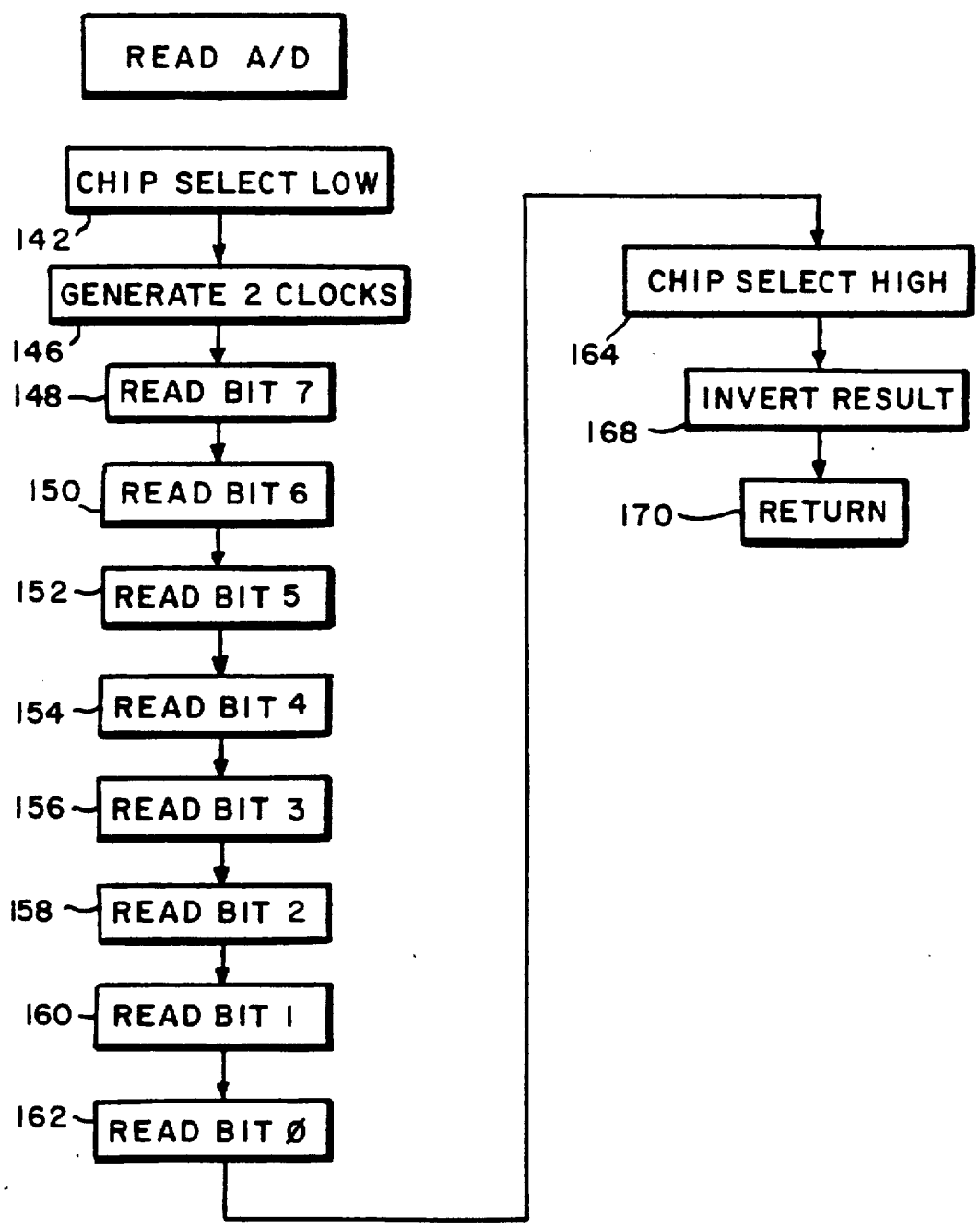

FIG. 6 is a flow diagram of a "read A/D" routine suitable for use as the "read A/D" routine in the "print" routine of FIG. 4.

Figure 7:
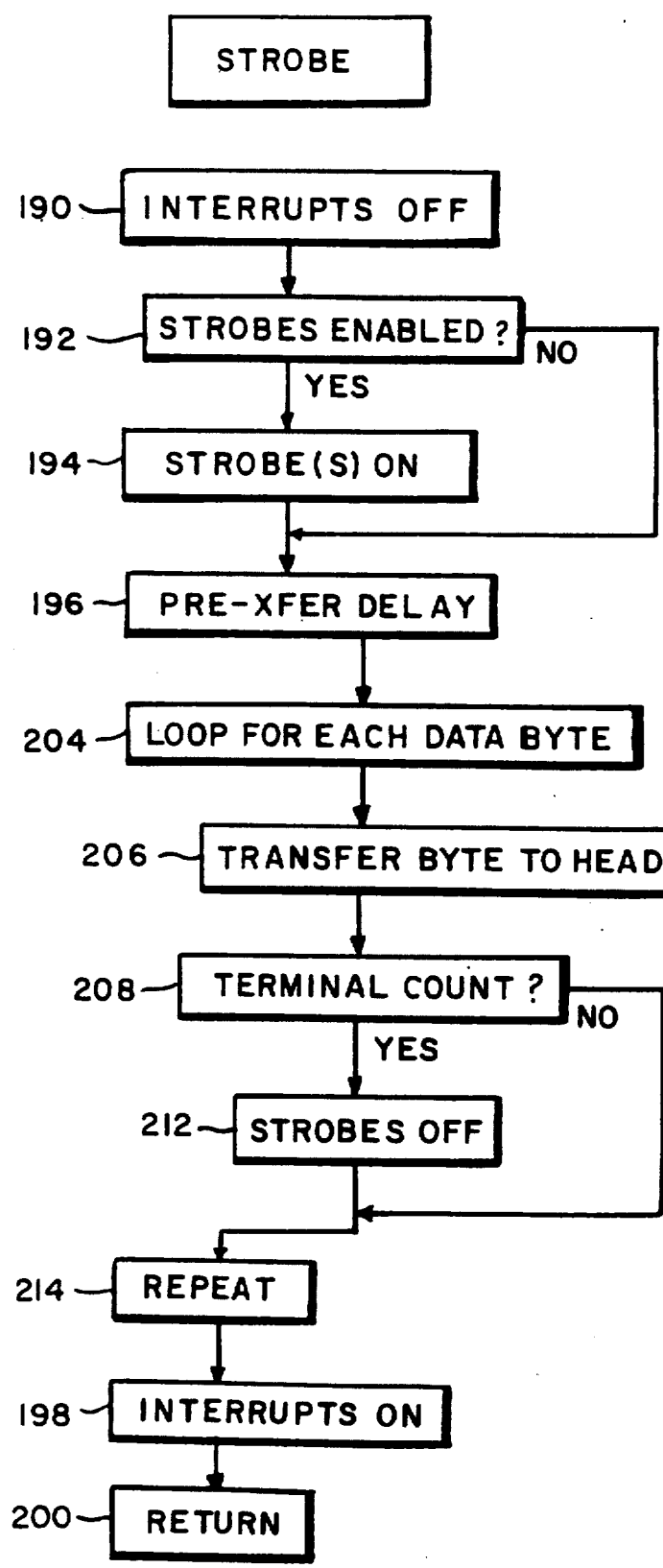

FIG. 7 is a flow diagram of a "strobe" routine suitable for use as the "strobe" routine in the "print" routine of FIG. 4.

DETAILED DESCRIPTION

Figure 1:
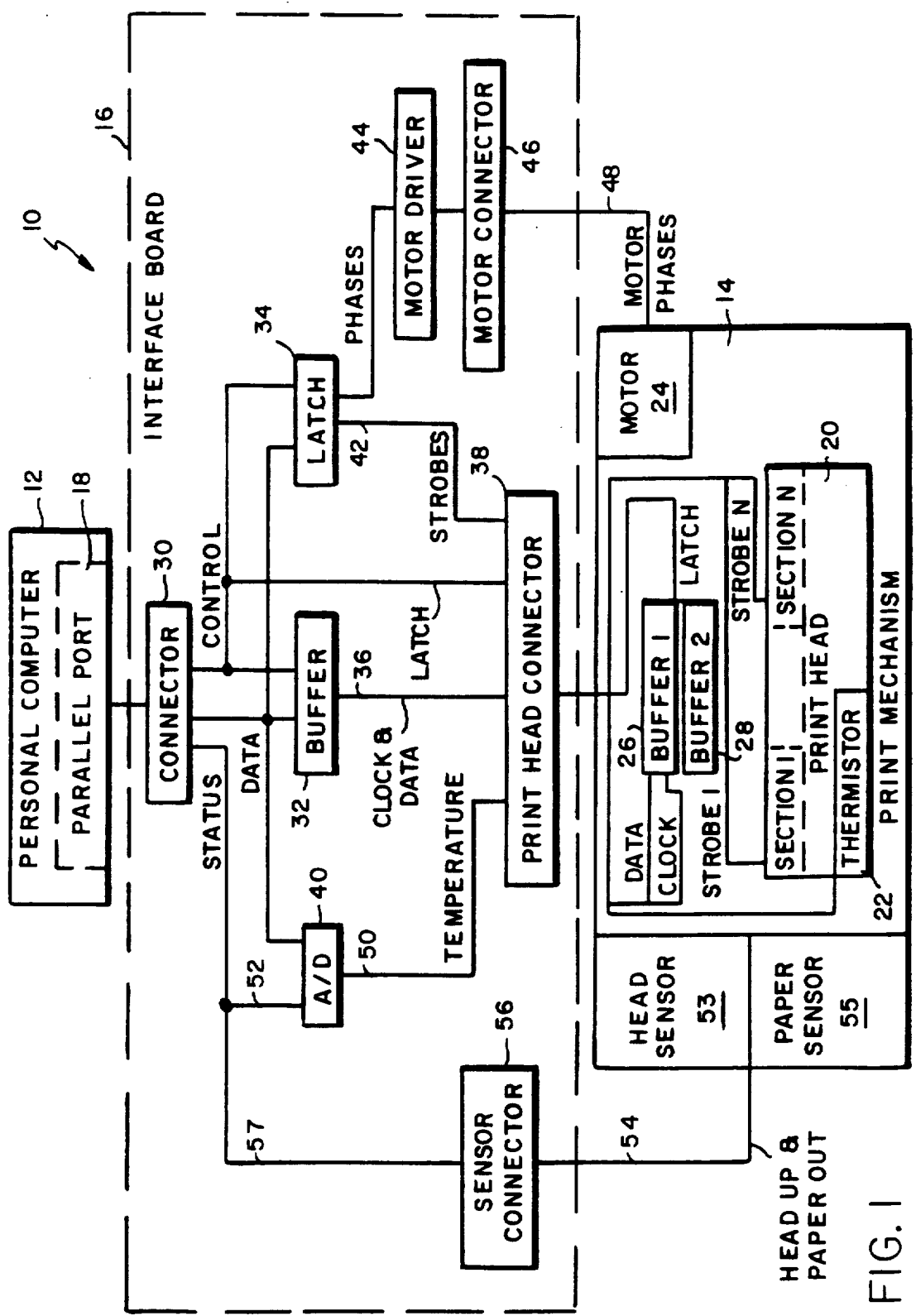

FIG. 1 is a schematic block diagram of a system suitable for use in accordance with the teachings of this invention. Referring to this figure, the system 10 has three basic elements, a processor 12, a thermal printer mechanism 14, and an interface circuit 16. The processor 12 is preferably a personal computer (PC) having a parallel port 18. The parallel port 18 typically has eight data lines, four control lines, and four status back lines. Computer 12 is programmable to perform the various functions set forth herein.

Thermal printer mechanism 14 may be any of a variety of standard thermal printers available from companies such as Seiko Instruments, Inc, Fujitsu Limited, and Gulton Industries. Such printers typically have a print head 20 which may print a single line at a time, which line may for example have five, eight byte sections (with eight bits in each byte), for a total of 320 resolution points. The printer also has a thermistor or other suitable mechanism 22 for detecting the temperature of the print head, a motor 24 for stepping paper or other material in the printer and a pair of buffers 26 and 28. The printer operates such that a line of data to be printed may be loaded serially into buffer 26. When a full line has been loaded into this buffer, the line is transferred into buffer 28 by means of a latch signal, with the line in buffer 28 being used as data for the printhead 20.

Motor 24 may for example be a four phase stepper motor which is stepped forward one position each time there is a suitable change in motor-phase.

Interface circuit 16 has a connector 30 which is adapted to mate with parallel port 18. Connector 30 may have sixteen contacts to accommodate the eight data lines, four control lines and four status back lines from port 18.

Interface circuit 16 also has a buffer 32 and a latch 34 which are connected to receive outputs from connector 30. Buffer 32 receives data to be printed, and passes such data and associated clocks through serial line 36 and a printhead connector 38 to buffer 26 of print mechanism 14. Buffer 32 may be loaded with parallel data or serial data from port 18, depending on the buffer type used. Latch 34 stores control bits for controlling motor 24. Latch 34 also stores strobe control bits which are applied through strobe lines 42 and print head connector 38 to control the strobing of print head 20.

The motor control bits are applied to a high current converter, motor driver 44 which applies the phase control information for the printer through a motor connector 46 and lines 48 to control motor 24.

The temperature sensed by thermistor 22 is applied through connector 38 and temperature line 50 to A/D convertor 40. The digital output from converter 40 is serially applied through status back line 52 and connector 30 to computer 12, providing temperature information on the printhead to the PC Printer mechanism 14 also has a head sensor 53 which senses whether the print head is up or down, and a paper sensor 55 which senses when the printer is out of paper. Output lines 54 from sensors 53 and 55 contain signals indicative of whether the printhead is up or the printer is out of paper. Outputs on these lines are applied through sensor connector 56 and status back lines 57, and connector 30, to computer 12.

The manner in which the computer 12 is programmed to control the various components shown in FIG. 1 to perform print and related operations is illustrated by the flow diagrams of FIGS. 2-7. Referring first to FIG. 2, the main program or routine for controlling print mechanism 14 is shown. The first step in this operation, step 70, is to initialize the parallel port 18. During this step, various housekeeping functions are performed so that the PC 12 may be dedicated to the function of operating and controlling print mechanism 14 during the period that the PC is being used for this function.

Figure 3:
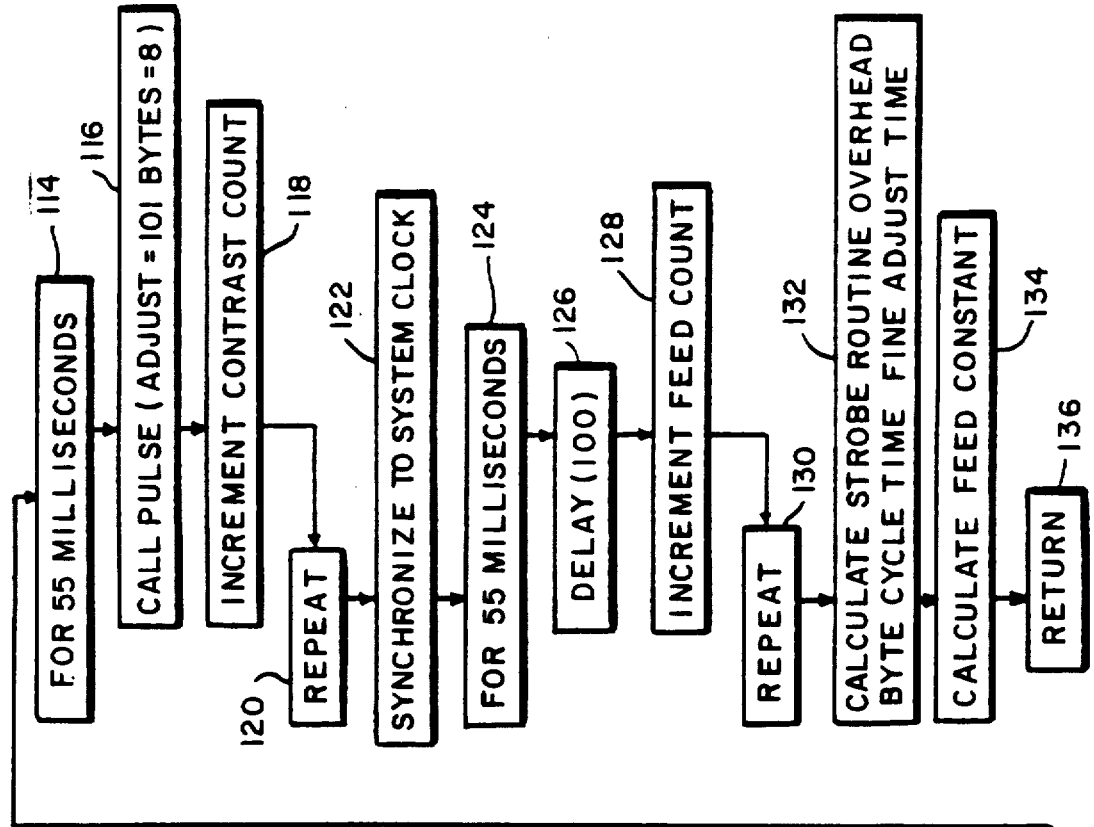
FIG. 3 is a flow diagram of a "speed" routine suitable for use as the "speed" routine in the program of FIG. 2.
Figure 3:
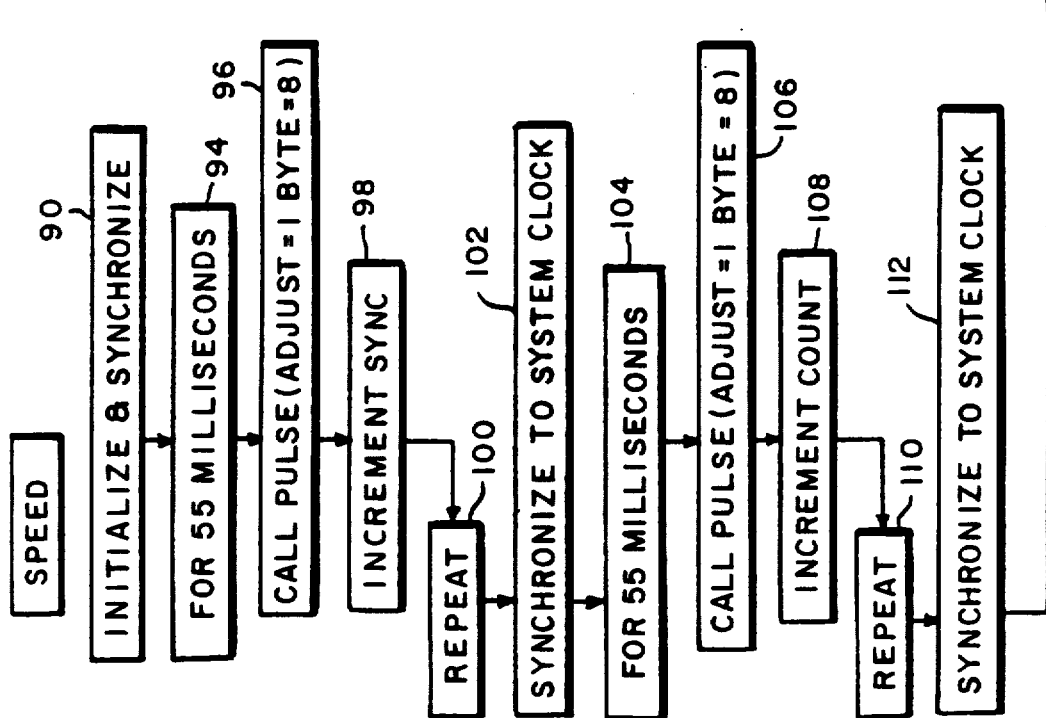

The next step in the operation, step 72, is to call the speed routine, which routine is shown in FIG. 3. During this operation, the system is used to simulate the printing of blank labels in order to count the number of lines or bytes which may be printed during a predetermined time interval, for example 55 milliseconds. The overhead of the computer in performing these operations and the time required to do a line feed are also determined during operation of the speed routine. This information is then utilized to determined the operating speed of PC 12. This information, and in particular the times determined for transferring bytes between the PC and the printer, is then utilized to control the duration of the strobe pulses so that they last for exactly the desired strobe pulse duration regardless of the operating speed of the PC or other processor utilized. The operation of the speed routine will be described in greater detail later in conjunction with the description of FIG. 3.

When, during step 74, it is determined that the speed routine has been completed, the operation proceeds to step 76 to determine if there is a label or other item to be printed which is complete for printing. If there is a label or other item complete and ready for printing, the operation proceeds to step 78 to call the print routine shown in FIG. 4. This routine causes the head temperature to be read and the desired strobe width to be set based on the detected head temperature and the operating speed for PC 12 determined during the speed routine. Assuming that head temperature does not exceed a predetermined threshhold, this routine then causes data to be printed to be loaded into buffer 26, while the previous line loaded into buffer 26 and now in buffer 28 is utilized to control the printhead 20. The number of sections or bytes of the line of data stored in buffer 28 which are strobed during any given strobe cycle is determined by the bits stored in latch 34. After each line is printed, a phase signal is applied to motor 24 to cause the stepping of this motor and the next line is then printed. This sequence of operations is repeated until printing of the label or other item is completed. The details of the print routine will be described later in conjunction with a description of FIG. 4.

Either after step 76 if there is no label complete for printing, or after step 78 when the printing of a label or other item has been completed, the operation proceeds to step 80 to determine if a feed is required to advance the printer a predetermined number of lines to the next label or other item to be printed. If a feed is required, the operation proceeds to step 82 to call the feed routine shown in FIG. 5. This routine provides feed signals to step the printer motor until the printer has either been stepped to the desired position or it is detected that the printer is out of paper or other media to be printed on.

If during step 80 a determination is made that no feed is required, or if the feed routine has been completed (step 82) if a feed is required, the operations proceeds to step 84 to determine if additional labels are to be printed and to return to step 76 if such labels are to be printed. When, during step 84 it is determined that the printing operation is complete, the operation proceeds to "return" step 86 which may free PC 12 to be utilized for other functions.

FIG. 3 is a flow diagram of the speed routine performed during step 72. When the speed routine is called, the first step is step 90 during which the processor synchronizes on the leading edge of a 55 millisecond internal clock signal from the PC12. To the extent a 55 millisecond internal clock does not exist for the computer being utilized, the process could be adjusted to operate with an internal clock of other duration.

Once step 90 has been completed, the operation proceeds to perform steps 94, 96, 98 and 100. During these steps, for the 55 millisecond duration of the synchronized internal clock, the strobe routine is repetitively called, but strobes and data loading are not actually performed. A count is incremented during step 98 each time a strobe routine is called. Steps 96 and 98 are repeated until the 55 millisecond clock times out. From the count of the number of strobes routines which were called during the 55 millisecond time interval, the processor can determine the overhead time involved in calling the strobe routine. This time duration is stored.

During step 102 the system is again synchronized with the leading edge of an internal clock as the clock began a 55 millisecond time interval (step 104). During this 55 millisecond interval, steps 106 and 108 are repeated as many times as possible (step 110). During step 106, the strobe routine is called and, for example, a section having 8 bytes (64 bits) of data are loaded from processor 16 into buffer 26 of printer mechanism 14. Dummy data is loaded during this operation. During step 108, the count of the number of times step 106 is performed is incremented. This sequence of operations is repeated until the 55 millisecond clock times out, at which time the count in the counter incremented during step 108 indicates the number of print line load cycles, including overhead time, performed during the 55 millisecond time interval, and thus the time required for the processor being used to load a single byte can be calculated. This time is referred to as the "load time".

During step 112, the next step in the operation, the system is again synchronized to the leading edge of a 55 millisecond internal clock, this clock being indicated by step 114. During this clock, steps 116 and 118 are repeated as many times as possible (step 120). During step 116 the strobe routine is called with a fine adjust count of 101 and a single print line of 8 bytes is loaded during each one of these strobe cycles. A suitable count is incremented each time step 116 is completed, this operation being performed during step 118. When the 55 millisecond clock times out, the count which is accumulated during step 118 provides an accurate indication of the fine adjustment time.

Finally, during step 122 the system synchronizes on the leading edge of a 55 millisecond internal clock which clock runs during step 124. During the 55 millisecond clock, steps 126 and 128 are performed as many times as possible, the repeating of these steps being indicated by step 130. During step 126, a dummy line feed operation is performed, and at the end of each dummy line feed operation, a feed count is incremented during step 128. When the 55 millisecond clock times out, the feed count accumulate during step 128 is thus an indication of the time required during a "wait" routine to reach a count of 100, which time is used to calculate a constant for the line feed operation.

Once the various counts have been accumulated, processor 12 utilizes these counts to determine the overhead time, the load time and fine adjust time for the strobe cycle during step 132. These times are then used to produce a strobe pulse having the desired time duration. For example, assuming that a 640 microsecond strobe pulse is desired, that it takes 100 microseconds with the particular processor 12 to complete the loading of a single byte excluding overhead and that the fine adjust time is one microsecond, a strobe pulse would last for 6 full line byte loading cycles plus a fine adjust count of 40. It is noted that the required strobe time also varies with head temperature. Thus, a memory could be provided which would be addressed by the detected head temperature and would read out either the desired strobe duration, from which cycle and delay times could be determined, or preferably, the number of load cycles and number of fine adjust cycles required to achieve a desired strobe time for the given head temperature, these numbers being determined during step 132 from the times calculated to perform each of these operations.

During the next step in the operation, step 134, the processor 12 determine the time required for the processor to complete a line feed operation, this calculation being performed from the data obtained during steps 124-130. As will be discussed in greater detail later, it is desired that feeds be given at a uniform rate. Therefore a feed constant delay is determined which is added to the calculated feed time in order to obtain the desired constant feed time.

When step 134 has been completed, the speed routine is finished and the operation returns through step 136 to step 74 (FIG. 2) to determine if a label is complete for printing. If a label is complete for printing, the operation proceeds to step 78 to call the print routine shown in FIG. 4. Referring to FIG. 4, the first step in this operation is step 140 which calls the read A/D routine. This step thus causes A/D convertor 40 to be probed to determine the printhead temperature being read by thermistor 22. The read A/D routine is shown in FIG. 6.

Referring to FIG. 6, the first step in this operation, step 142, is to provide a control through connector 30 to the A/D convertor 40 to enable the converter. During step 146, the next step in the operation, two clock signals are generated to the A/D circuit or chip which cause the A/D 40, which has been enabled, to start being read out. The A/D data is read out a bit at a time during steps 148-162, with the highest order bit, bit 7, being read out during step 148 and the lowest order bit, bit 0 being read out during step 162.

When the eight bit temperature indication has been transferred to PC 12, the operation proceeds to step 164 to disable the A/D converter 40. Because of particular components used for the preferred embodiment, it is also necessary to perform step 168 to invert the results, since the readout is provided in inverted form. When step 168 has been completed, the operation returns through step 170 to the print routine of FIG. 4, and in particular to step 172 of this routine.

During step 172, the strobe width is set for the particular PC being used and the particular detected head temperature, the head temperature having been detected during step 140. The strobe width may be set by using the temperature to access a table which either provides the desired strobe duration for the detected temperature, which is then converted into a number of load cycles and fine adjust cycles required to equal the indicated strobe time, or the number of load cycles and fine adjust cycles required to equal the required strobe time may be read directly from the table.

During step 174, the next step in the operation, the processor checks the detected head temperature which is read during step 140 to assure that it does not exceed a predetermined threshhold. If the head temperature exceeds a predetermined threshhold, the print operation is aborted, as indicated by return step 176, which is performed if the head temperature exceeds the threshold.

If the head temperature is below the threshold, then the operation proceeds to perform steps 178, 180, and 182 until the first group of bytes to be printed has been fully loaded into buffer 26. The group of bytes to be printed may be an entire line, but could typically be one or more sections. In particular, during step 180, the strobe routine shown in FIG. 7 is called. The first step in the strobe operation, step 190, causes the inhibiting of any interrupt to the system during the strobe routine. This is important since, as previously indicated, the duration of the strobe pulses is critical and it is important to ensure that nothing happens during a strobe which would or could cause a change in the duration of the strobe pulses.

During Step 192, the next step in the operation, a determination is made as to whether strobes ar to be enabled for the byte positions indicated during step 194. If the strobes are not to be enabled, as would be the case for example if there is nothing to print when step 194 is being performed, such as when loading the first line, the operation proceeds to step 196. If during step 194 strobes are to be enabled, as is normally the case, the operation proceeds to initiate a strobe cycle.

During step 194, latch 34 is loaded with one or more bits which indicate the sections to be strobed during the given strobe cycle. As previously indicated, there are a number of separate sections which may be independently strobed during each strobe cycle, the section or sections of byte or bytes being strobed during a strobe cycle being controlled by the bits stored in latch 34. Thus, if only a single bit is stored in the first position of latch 34, only the first section of the line stored in buffer 28 would be energized. If bits are set in the second and fourth position of latch 34, then the second and fourth sections of the line stored in buffer 28 would be strobed during the strobe interval. Depending on the desired peak current, printing speed and other factors, bits may be loaded into any one or more of the bit positions in latch 34 during step 194. Thus, if print speed were the only criteria, all sections to be printed could be simultaneously strobed, but this would increase the required peak power. Peak power is reduced by reducing the number of sec ions simultaneously probed. It is noted that during step 180, since there is no data in buffer 28 to be printed, all zeros would be loaded into latch 34 during step 194.

The timing for the strobe cycle begins with step 196 during which a number of fine adjust cycles are executed which is equal to the number of fine adjust cycles determined to be required in order to fine tune the strobe interval. If the number of bytes in a section or sections to be loaded is less than the byte cycles required to complete the strobe interval, dummy byte load cycles may also be performed at this time to achieve the required strobe interval.

From step 196, the operation proceeds to perform steps

During these steps a byte of data is loaded, a bit at 204-214. During these steps a byte of data is loaded, a bit at a time, into buffer 26. This loading of data continues until a number of byte load cycles has been completed sufficient such that the strobe interval is determined to have passed, at which time the strobes are turned off. In particular, during step 206, a byte of data from PC 12 is loaded, a bit at a time, through buffer 32 and line 36 into buffer 26 of the print mechanism. When the loading of the byte has been completed, a counter is incremented or decremented during step 208, depending on the way a terminal count determination is made, and a determination is made as to whether a terminal count has been reached. If a counter is incremented for each byte loaded, then the value of this count is compared against a desired terminal count and a yes output obtained during step 208, when these counts are equal. If, on the other hand, the desired terminal count is loaded into the counter during step 204, then this count is decremented during step 208 and a determination is made as to whether the count has reached zero. When the count reaches zero, a "yes" output is obtained during step 208. If a "no" output is obtained during step 208, the operation proceeds to step 214 to repeat the operation with the loading of an additional byte. The sequence continues until, during step 208, it is determined that the terminal count has been reached, in which event the operation proceeds to step 212 to turn the strobes off.

The operation then proceeds to step 214 to determine if there are still data bytes of the selected sections or other byte group to be loaded. If there are still data bytes to be loaded, the operator repeats steps 204, 206 and 214 until the first group of bytes have been loaded into buffer 26.

When all bytes of the group have been loaded, the operation proceeds from step 214 through steps 198 and 200 to return to step 182 (FIG. 4). During step 182, a determination is made as to whether all byte groups for the line being loaded have been loaded, and whether all sections (or other byte group) of the line being printed have been strobed. If there are still one or more byte groups or sections to be loaded or strobed, the operation returns to step 178, and steps 178, 180 and 182 are repetitively performed until all sections of the appropriate line are loaded and strobed, respectively. When this occurs, the operation proceeds from step 182 to repetitively perform steps 216-226. During step 218, motor 24 is turned on and the motor is stepped one position to bring the desired first line to be printed into alignment with the printhead. During step 76 (FIG. 2), the label was initially positioned one line short of the desired print position. The operation then proceeds to step 219 during which processor 12 generates a latch signal resulting in the internal transfer of the data line stored in buffer 26 to buffer 28.

From step 219, the operation proceeds to perform steps 220-224. In particular, during step 222, the strobe routine shown in FIG. 7 is called. However, at this time there is a line of data to be printed in buffer 28 so that, during the strobe routine, one section of data or other byte group for a line is being strobed while bytes for the succeeding line of data are being loaded. Thus, referring to FIG. 7, after steps 190 and 192 have been performed, a predetermined one or more bits is loaded into latch 34 to control the byte section or sections to be strobed when the strobes are enabled. No data transfer are permitted during this strobe latch loading operation. The strobes are then enabled for a period which is determined by the fine adjust delays introduced during step 196 and the loading of a number of data bytes required to achieve the desired strobe time for a given head temperature and PC utilized. During each cycle through steps 204, 206, 208 and 214, an additional byte is serially loaded from the PC into register 26 of the print mechanism. When the terminal count is reached, the strobe is turned off and the operation continues until the desired number of bytes have been loaded, at which time operation goes to step 198. During step 198, the interrupts are turned on. Operation continues through step 200 and goes to step 224 during which a determination is made as to whether all sections of the line being printed have been strobed and whether all bytes of the succeeding line being loaded have been loaded. If there are still bytes to be strobed and/or loaded, the operation returns from step 224 to step 220 and step 222 to recall the strobe routine. This may result in an additional one or more sections of the line being printed to be strobed while additional bytes of the following line are being loaded, may result in only the loading of remaining bytes, all bytes of the line to be printed having been strobed, or may result only in the strobing of an additional one or more sections of the line being printed, all bytes of the succeeding line having already been loaded into register 26. If strobing of sections of the line being printed is required after all bytes of the succeeding line had been loaded, then a dummy load operation is performed during step 06 so as to permit the desired strobe time to be obtained. When, during the performance of step 224, a determination is made that both all sections of the line to be printed have been printed and that all bytes of the succeeding line have been loaded into buffer 26, then the operation proceeds from step 224 to step 226 to determine if all lines for the particular label have been printed. If all lines have not been printed, then the operation returns through step 216 to step 18 to step the motor 24 by applying a signal over line 48 to change the motor phase, thus stepping the motor, and to steps 220 and 222 to again call the strobe routine. This results in the line now stored in buffer 28 (i.e. the line which was loaded into buffer 26 during the proceeding cycle) being strobed, while the data bytes of the next line to be printed are being loaded into buffer 26. This operation is performed in the manner previously described.

Steps 216-226 are repeated until, during step 226, it is determined that all lines for a given label have been printed. It should be noted that for a strobe cycle during which the last line of the given label is being strobed and printed, there are two options. The first option is that, during the strobe cycle, only dummy byte transfers are performed during step 206 (FIG. 7), so that there is no next line to be printed in buffer 26 at the end of the strobe cycle, and both buffers 26 and 28 are empty at the end of the print cycle. This is the mode of operation for the preferred embodiment. A second option, which may be utilized when a given label is to be repetitively printed, is to load the first line of the label during the strobe cycle when the last line of the label is being strobbed and printed. This mode of operation is advantageous in that it eliminates the need for an extra strobe cycle to load the first line into buffer 26 during the print routine for the next label. From step 226, the operation proceeds to step 228 to turn off power to the motor. The operation then proceeds to step 176 to return to step 80 in the main routine (FIG. 2).

During step 80, a determination is made as to whether a feed is required. A feed is normally required when the printing of a label or other item has been completed and the medium on which printing is being accomplished is to be stepped forward a selected number of lines so as to be in a position to print the next label or to perform another desired print operation. If no feed is required, the operation proceeds to step 84 to determine if the printing operation is complete. If the operation is not complete, the operation returns to step 74 to determine if there is another label ready for printing and the operation cycles through steps 74-84 until neither a print operation nor a feed operation is required. If, during step 80, a determination is made that a feed operation is required, as would normally be the case after the printing of a label or other item has been completed, the operation proceeds to step 82 to call the feed routine, which routine is shown in FIG. 5.

Referring to FIG. 5, the first step in the feed routine, step 230, is to store an indication of the feed length (i.e. the number of feed lines which are required). From this step, the operation proceeds to step 232 during which the motor is set to its next phase. Since the motor is a standard four phase motor, setting the motor to its next phase results in the motor being stepped forward one step. During step 234, the index which indicates the current state of the motor, which index is stored in an appropriate register or memory in PC 12, is incremented to reflect the current motor phase.

As was previously indicated, it is desirable that the line feeds be performed at a uniform rate regardless of the operating speed of the processor. Therefore, during the speed routine, the line feed time with the PC being utilized was determined, and a delay feed constant was calculated which is the delay required in order for the feed time for a line with the PC used, plus the feed delay constant, to equal the desired uniform feed time. During step 236 the operation is thus delayed by this feed constant time.

During step 238 a check is made to determine if there is still paper in the printer. This is accomplished by activating paper sensor 55 which generates a paper out indication over line 54 through connector 56 to computer 12. If it is determined that there is paper in the printer, then, during step 240, a determination is made as to whether the desired number of feeds have been made. If the desired number of feeds have not been made, then the operation returns to step 230 to cause an additional feed operation to be performed. If the desired number of line feeds have been accomplished during step 240, or if during this step it is determined that the printer is out of paper, the operation proceeds to step 242 to turn off motor 24 and the operation returns through step 244 to step 84 (FIG. 2).

If during step 84 it is determined that there are additional labels to be printed, then the operation returns to step 74 to cause an additional print operation. However, if during step 84 it is determined that all labels or other items to be printed have been printed, then the operation proceeds to step 86 which, as previously indicated, ends the print operation, permitting processor 12 to be utilized for other functions.

In FIG. 2, it is indicated that a speed routine is performed each time the computer starts a ne print operation. While this is desirable, particularly when using computers which may be programmed to operate at more than one speed, and takes little time (generally only a few hundred milliseconds), this is not a limitation on the invention. Thus, if the computer speed is known, or once the computer speed is determined by an initial running of the speed routine, it may not be necessary to run the speed routine for each printing session.

A processor/thermal printer interface is thus provided which permits the thermal printer to be directly controlled from a number of different personal computers or other processors having a variety of operating speeds, while still maintaining a desired strobe pulse duration. The interface provides maximum flexibility in transferring data between the processor and the printer and in the strobing of the printer so that the current peaks required to operate the printer may be maintained below a desired level and a desired printing rate maintained.

While a particular preferred embodiment has been shown an described above, it is apparent that the teachings of this invention may be applied utilizing other hardware performing the same or equivalent functions. For example, while a single printer mechanism 14 has been shown in FIG. 1 as operating from computer 12 and interface 16, it may be possible to operate several printers from a single computer and interface and/or to operate several interfaces from a single computer. Similarly, the particular sequences of steps indicated above for performing the various functions are for purposes of illustration only with respect to a preferred embodiment, and various modifications in the steps, or in the sequencing thereof, are also possible. Thus, while the invention has been particularly shown and described above with reference to a preferred embodiment, the foregoing and other changes in form and detail may be made therein by one skilled in the art without departing from the spirit and scope of the invention.

What is claimed is:

1. An interface for operating a thermal printer from a selected processor, the printer having a print head and a buffer, the interface comprising:
   means for determining the operating speed of the processor;
   means for loading a line of data to be printed into said buffer;
   means for strobing said print head with data from said buffer; and
   means responsive to the determined operating speed of the processor for controlling the duration of each strobe by said strobing means, whereby a desired strobe duration may be obtained regardless of the operating speed of the processor.

2. An interface as claimed in claim 1 including means for sensing the print head temperature; and
   wherein said strobe duration controlling means is also responsive to the head temperature.

3. An interface as claimed in claim 2 including means operative if the sensed head temperature exceeds a predetermined threshold for terminating operation of at least said means for strobing.

4. An interface as claimed in claim 1 wherein said printer has first and second buffers, wherein said means for loading initially loads a line of data into said first buffer, the data being transferred from the first buffer to the second buffer when loading of a line into said first buffer is completed, said means for strobing utilizing said second buffer, and wherein said means for strobing is operative concurrently with said loading means.

5. An interface as claimed in claim 4 wherein each line of data is formed of a plurality of bytes, wherein said means for loading loads the bytes of a line serially, and wherein there is a predetermined overhead time in the loading of a line.

6. An interface as claimed in claim 5 wherein said operating speed determining means includes means for determining the time required for the selected processor to load one byte and the overhead time for the selected processor.

7. An interface as claimed in claim 6 wherein said means for controlling achieves a desired strobe duration by permitting the strobe to last for a number of byte loading cycles and a number of fine adjust overhead time cycles, the combined duration of which equals said desired strobe duration.

8. An interface as claimed in claim 5, wherein bytes stored in said second buffer are grouped into a plurality of sections, each section having one or more bytes, and wherein said means for strobing includes means for strobing any one or more of the sections of a data line stored in said second buffer.

9. An interface as claimed in claim 8 wherein said means for strobing includes a strobe latch having a bit position for each section of a data line, and means operative before each strobe for loading a bit into said latch in the one or more bit positions corresponding to the sections to be strobed during the next strobe.

10. An interface as claimed in claim 9 wherein latch loading means loads said strobe latch in parallel from the selected processor;
   wherein said means for loading loads bits of a data line serially from said processor; and
   including means for normally passing serial data bits from said processor to said first buffer and for inhibiting the passing of data bits when bits are being passed to said strobe latch.

11. A method for interfacing a thermal printer to be operated from a selected processor comprising the steps of:
   determining the operating speed of the processor;
   loading a line of data to be printed into a selected printer buffer;
   strobing a printer print head with the data in the buffer; and
   controlling the duration of each strobe during the strobing step in response to the determined operating speed o the processor, whereby a desired strobe duration may be obtained regardless of the processor operating speed.

12. A method as claimed in claim 11 including the step of sensing the print head temperature; and
   wherein said strobe duration controlling step is also responsive to the head temperature.

13. A method as claimed in claim 12 including the step of terminating at least said strobing step if the sensed head temperature exceeds a predetermined threshold.

14. A method as claimed in claim 11 wherein said loading step includes the steps of initially loading a line of data into a first printer buffer, and transferring a line of data from the first buffer to a second printer buffer when loading of a line into said first buffer is completed; and wherein said strobing step utilizes said second buffer, the strobing step occurring concurrently with said loading step.

15. A method as claimed in claim 14 wherein each line of data is formed of a plurality of bytes, wherein said loading step loads the bytes of a line serially, and wherein there is a predetermined overhead time in the loading of a line.

16. A method as claimed in claim 15 wherein said speed determining step includes the step of determining the time required for the selected processor to load on byte and the overhead time for the selected processor; and
   wherein said controlling step achieves a desired strobe duration by permitting the strobe to last for a number of byte loading cycles and a number of fine adjust overhead time cycles, the combined duration of which equals said desired strobe duration.

17. A method as claimed in claim 15 wherein bytes stored in said second buffer are grouped into a plurality of sections, each section having one or more bytes, and wherein the strobing step includes the step of strobing any one or more of the sections of a data line stored in said second buffer.

18. A method as claimed in claim 17 including a strobe latch having a bit position for each byte of a data line; and wherein said strobing step includes the step, performed before each strobe, of loading a bit into said latch in the one or more bit positions corresponding to the sections to be strobed during the next strobe.

19. A method as claimed in claim 18 wherein said latch loading step loads said strobe latch in parallel from the selected processor;
   wherein said loading step loads bits of a data line serially from said processor; and
   including the steps of normally passing serial data bits from said processor to said first buffer and inhibiting the passing of data bits when bits are being passed to said strobe latch.

* * * * *